United States Patent [19]
Giaccardi et al.

[11] Patent Number: 5,172,048
[45] Date of Patent: Dec. 15, 1992

[54] DEVICE FOR MEASURING THE NUMBER OF REVOLUTIONS OF THE SHAFT OF A PERMANENT MAGNET ELECTRIC MOTOR

[75] Inventors: Eraldo Giaccardi, Turin; Vito Scartezzini, Moncalieri; Claudio Ampala, Turin, all of Italy

[73] Assignee: Fiat Auto S.p.A., Turin, Italy

[21] Appl. No.: 629,407

[22] Filed: Dec. 18, 1990

[30] Foreign Application Priority Data

Dec. 18, 1989 [IT] Italy .................... 68110 A/89

[51] Int. Cl.⁵ .................... G01R 15/00; G05B 21/02
[52] U.S. Cl. .................... 324/158 MG; 324/158 R; 318/636
[58] Field of Search ............ 324/158 MG, 166, 173, 324/544, 545, 177; 318/490, 616, 629; 322/99; 340/648

[56] References Cited

U.S. PATENT DOCUMENTS

| | | | |
|---|---|---|---|
| 3,519,906 | 7/1970 | Kubler | 318/616 |
| 3,705,352 | 12/1972 | Restivo | 324/158 MG |
| 3,708,737 | 1/1973 | Johnson | 318/616 |
| 3,836,853 | 9/1974 | Cracraft et al. | 324/166 |
| 4,535,405 | 8/1985 | Hill et al. | 324/158 MG |
| 4,629,961 | 12/1986 | Blaschke | 324/158 MG |
| 4,691,152 | 9/1987 | Ell et al. | 318/618 |
| 4,733,148 | 3/1988 | Rodi | 318/490 |

FOREIGN PATENT DOCUMENTS 3234683 3/1984 Fed. Rep. of Germany ...... 324/177
0016369 1/1982 Japan .

OTHER PUBLICATIONS

Electronic Engineering, vol. 46, No. 562, Dec. 1974.

*Primary Examiner*—Vinh Nguyen
*Attorney, Agent, or Firm*—Frost & Jacobs

[57] ABSTRACT

The device measures the number of revolutions completed by the shaft of a permanent magnet electric motor in a period of time during which it is set in motion by the effect of its connection to a respective electrical supply source, essentially by means of calculation of the integral of the counter-electromotive force which the motor develops in the aforementioned period of time.

8 Claims, 2 Drawing Sheets a
DEVICE FOR MEASURING THE NUMBER OF REVOLUTIONS OF THE SHAFT OF A PERMANENT MAGNET ELECTRIC MOTOR

BACKGROUND OF THE INVENTION

This invention relates to a device for measuring the number of revolutions of the shaft of a permanent magnet electric motor.

In numerous applications in the automotive field electric motors are used to provide proportional control systems for the movement of components of the vehicle, such as the engine throttle, the regulating systems, storage and automatic positioning of the seats and/or of the rear view mirrors, etc.

The measurement of the total rotation or displacement obtained is frequently very important and revolution or displacement sensors are generally used.

Where the actuator consists of a permanent magnet reduction motor, the problem of measuring the number of revolutions is normally solved by adopting one of the following solutions:

recording the number of revolutions of the motor shaft by means of sensors of the optical type, or Hall effect type, or more rarely by means of electromagnetic sensors; knowing the motor reduction ratio the angular position or the displacement of the reduction motor can be calculated;

direct measurement of the angle of rotation (if no greater than 3600) of the shaft of the reduction motor, or of the axial displacement by means of sensors of the potentiometric type, or linear Hall effect sensors.

It has been found that the use of sensors is not entirely satisfactory from the point of view of space occupied, cost and the need to provide electrical connections to a control and data processing station normally present in the vehicle.

SUMMARY OF THE INVENTION

The object of this invention is to provide a device which enables the number of revolutions of the shaft of a permanent magnet electric motor to be measured without requiring the use of sensors, so that the disadvantages listed above can be avoided.

The aforementioned object is achieved with this invention in that it relates to a device for measuring the number of revolutions of the shaft of a permanent magnet electric motor in a period of time during which it is set in motion for the purpose of connection to a respective electrical supply source, characterised in that it comprises means of calculating the integral of the counter-electromotive force which the said motor develops in the said period of time.

BRIEF DESCRIPTION OF THE DRAWINGS

For a clearer understanding of this invention two preferred embodiments are described in the following, by way of non-exhaustive examples, with reference to the attached drawings, in which.

DETAILED DESCRIPTION OF THE INVENTION

Before proceeding to describe the configuration and operating conditions shown in the above-mentioned diagrams, it is considered appropriate to explain the fundamental theories on which this invention is based.

It is known that the armature conductors of a permanent magnet electric motor intersect, in their movement, the inducing magnetic field generated by the magnets; consequently they each become a source of an inducted electromotive force.

The resultant total value of all the induced electromotive forces depends on the number of revolutions per minute prime n of the motor shaft, and on the flow theta (constant value due to the contribution of the permanent magnets), according to the relation:

$$E = k\, n\, \Phi$$

where k is a constant dependent on the number of induced conductors, the number of poles and the type of winding of the armature conductors.

The direction in which the aforementioned electromotive force acts is opposite to that of the electric current circulating in the armature. In relation to the supply voltage applied to the brushes of the motor in question, the electromotive force E which is generated in the armature of the motor therefore acts as a counter-electromotive force.

The voltage V which must be applied to the terminals of the motor armature to cause them to absorb a current i must therefore overcome the counter-electromotive force E, increased by the internal voltage drops caused by resistance R of the armature circuit through which current i flows. Ohm's law applied to the armature circuit is:

$$V = E + R\,i$$

Recalling that $E = k\, n\, \Phi$, the following is obtained:

$$V = k\, n\, \Phi + R\, i, \text{ hence}$$

$$k\, n\, \Phi = V - r\, i$$

Integrating in time, the following is obtained:

$$\int_0^{t_1} kn\Phi\, dt = \int_0^{t_1} (V - Ri)\, dt$$

$$k\Phi \int_0^{t_1} n\, dt = \int_0^{t_1} (V - Ri)\, dt$$

Indicating with $$kN\Phi = Vt - R\int_0^{t_1} i\, dt, \text{ hence:}$$

$$N = \frac{1}{k\Phi}\left( Vt - R\int_0^{t_1} i\, dt \right) \qquad (1)$$

Once N has been calculated by means of formula (1) above, and once the reduction ratio is known (in the case of a motor provided with a reducer), the total angular rotation or linear displacement effected by the motor may easily be calculated.

The configurations and operating conditions in the diagrams in FIGS. 1 and 2, the purpose of which is essentially to obtain the value of N by simple measurement of the values in formula (1), are examined in the following.

Figure 1:
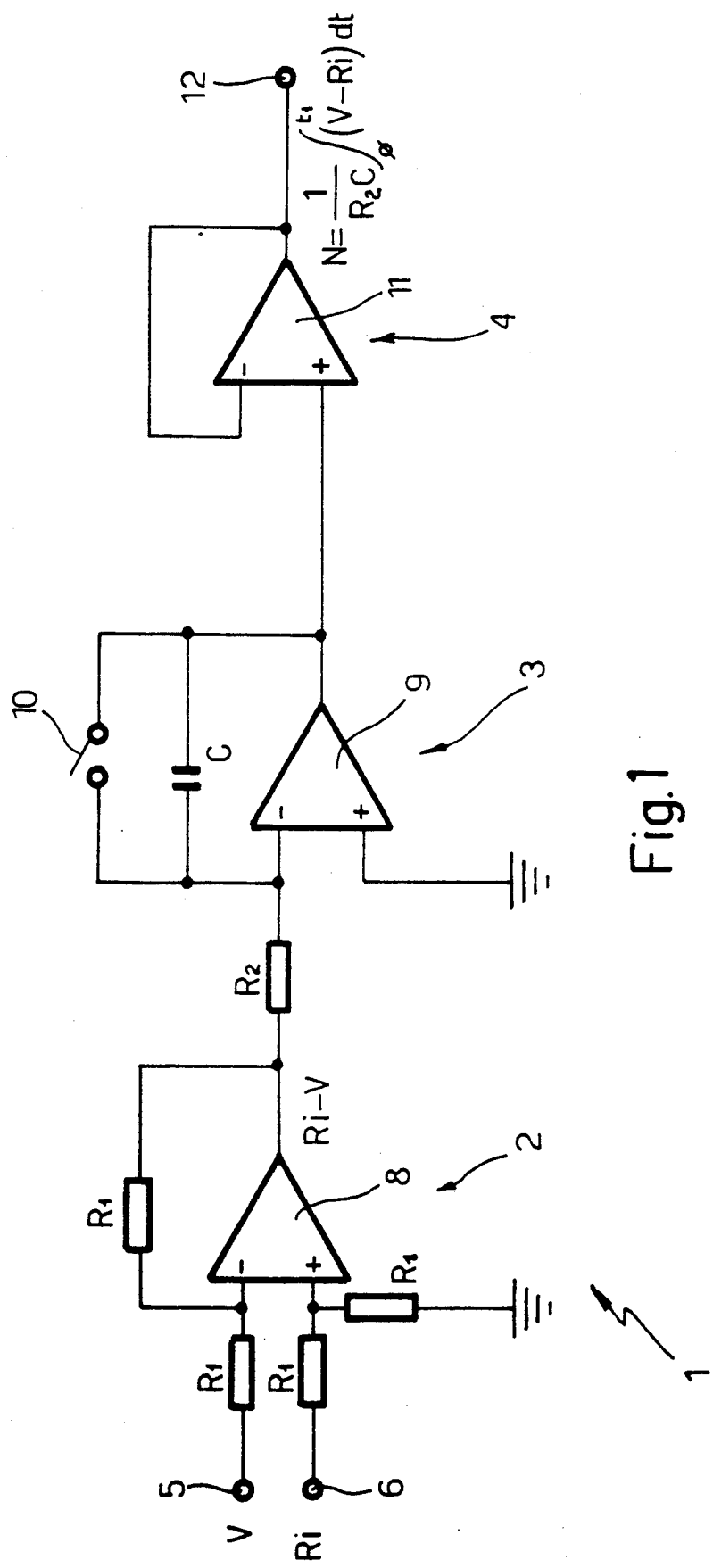
FIG. 1 is a block diagram of an embodiment of the device of the analogue type.

With particular reference to FIG. 1, a device in its entirety is denoted by the numeral 1, the device being constructed according to this invention for calculating the number of revolutions completed by an electric motor (not shown) in a predetermined period of time, denoted by t1, during which the motor, exhibiting an armature resistance with a value of R, is set in motion by the effect of the connection to a respective source of electrical supply, which provides a supply voltage with a value V, which enables a current of value i to flow through the motor armature.

Device 1 consists essentially of three circuit units connected in series, namely: an algebraic summation unit 2, an integrating unit 3 and a disconnection unit 4 with a high input impedance and a low output impedance.

Summation unit 2 is provided with two input terminals 5, 6, to which are fed motor supply voltage V and voltage drop R i, respectively, the latter being established in the armature as current i passes through it. These terminals 5, 6 are connected by identical resistances R1 to inverting inputs — and non-inverting inputs +, respectively, of an operational amplifier 8. The non-inverting input of the latter is connected to earth by means of a resistance R1, whilst the inverting input is connected to the output by means of a further resistance R1 identical to the aforementioned resistances. In this way an electrical signal, whose value is: R i−V, is available at the output of unit 2.

Integrating unit 3 is of the conventional type, with an input resistance R2, which is connected to the inverting input − of an operational amplifier 9, and to a capacitor C connected between the inverting input and the output of operational amplifier 9. The non-inverting input + of amplifier 9 is connected to earth, whilst a switch 10, whose actuation is controlled in synchronism with the electrical supply to the said motor, is connected in parallel with capacitor C, for which purpose the switch is kept open only for the period of time during which the electric motor is supplied with voltage V.

An electrical signal, whose value is exactly $$\frac{1}{R2C} \int_0^{t_1} (V - Ri) dt$$

is available at the output of integrating unit 3. This signal is made available to an output terminal 12 of device 1, after having passed, without any variation in amplitude, through disconnecting unit 4, which consists essentially of an operational amplifier connected in a "voltage follower" configuration.

In conclusion, by suitably choosing the values of R2 and C, so that the product R2 C is equal, for the motor in question, to the aforementioned product k Φ, an electrical signal is available at terminal 12 corresponding exactly to the number of revolutions N which the motor completes in an interval of time t1 in which it is supplied with voltage V.

Figure 2:
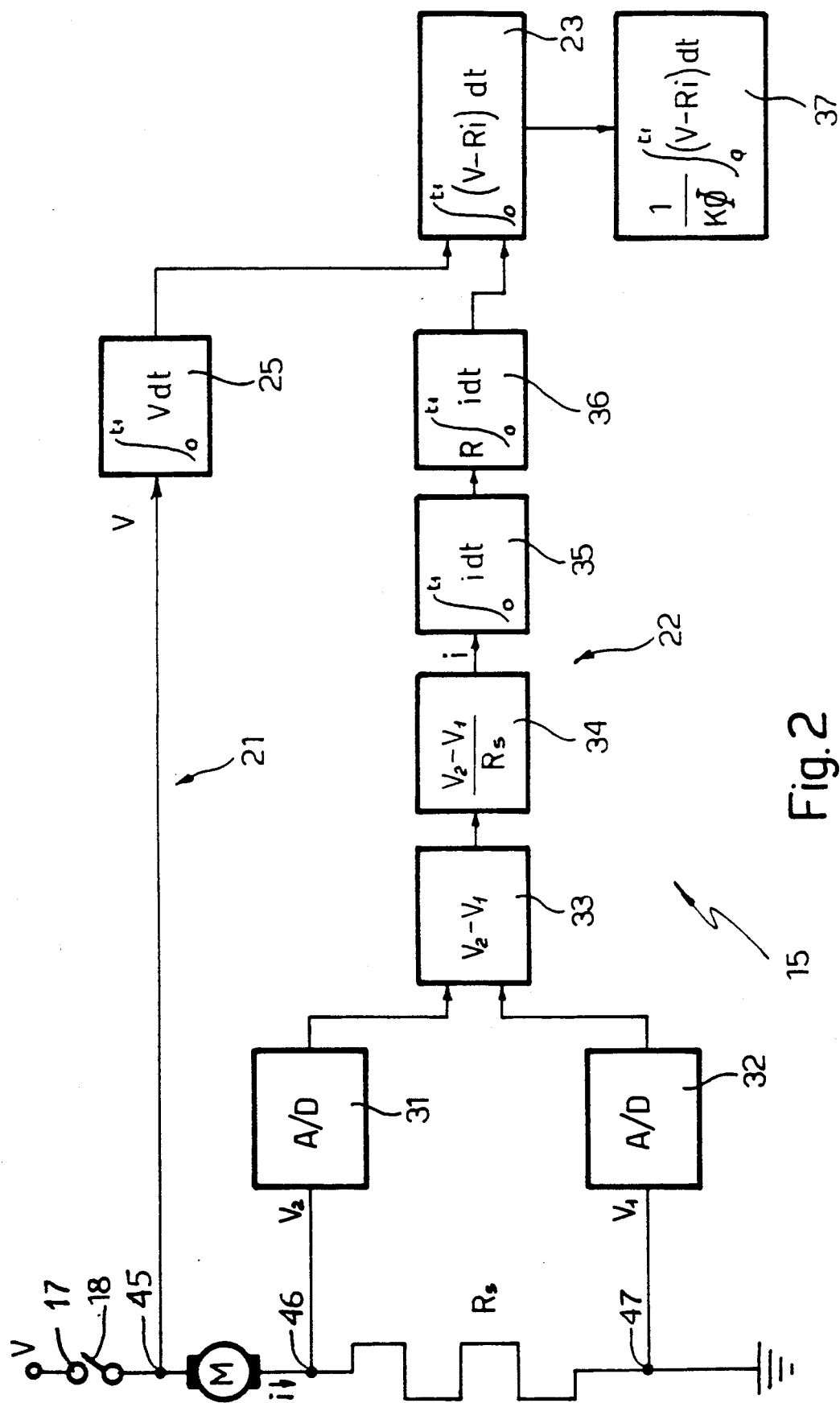
FIG. 2 is a block diagram of an embodiment of the logic type of the device.

With reference to FIG. 2, an entire device constructed according to this invention is denoted by 15 and is designed for calculating the number of revolutions completed by an electric motor M in a predetermined period of time, denoted by t1, during which the motor, exhibiting an armature resistance with a value R, is set in motion by the effect of the connection to a respective source of electrical supply which provides a supply voltage with a value V, which causes a current with a value i to flow in the armature of the motor.

In FIG. 2 motor M is arranged in a series circuit supplied, between a terminal 17 and earth, with voltage V, and exhibiting a switch 18 for controlling the electrical supply to the motor, together with a precision resistance Rs with a value much lower than the value of the aforementioned armature resistance R.

Device 1 5 is provided with two branches, 21 and 22 respectively, converging in an algebraic summation block 23.

Branch 21 consists of a single integrating block 25, which integrates the value of voltage V (e.g., received at input terminal 45) for the period of time t1 in which switch 18 is closed.

Branch 22 comprises a pair of analogue/digital converters 31, 32 connected to the terminals of resistance Rs (e.g., input terminals 46 and 47) for recording the respective voltage values V1, V2, and transmitting them to the inputs of an algebraic summation block 33, which provides the difference V2−V1. The output of block 33 is connected to a multiplying block 34, which multiplies the value V2−V1 by the inverse of value Rs to obtain the value i of the current flowing in motor M during operation.

Current i from the output of block 34 is first integrated in block 35, then multiplied by value R in block 36 to obtain the value $$R \int_0^{t_1} i dt$$

at the output of the latter.

Block 23 effects the difference between the output signals of blocks 25 and 36, whilst the successive block 37 effects the multiplication of the result obtained for the inverse of the product k Φ, in order to obtain the value of N similarly to that obtained with reference to device 1.

An examination of the characteristics of devices 1 and 15, constructed according to the details of this invention, shows the advantages which can be achieved with them.

In fact they enable the number of revolutions of a permanent magnet electric motor to be measured without having to use a sensor, with consequent substantial advantages from the point of view of reducing the space occupied, the cost as well as simplifying the cabling and the electronic interface circuits.

Finally it is clear that modifications and variants may be applied to devices 1 and 15 described above without departing from the spirit of this invention.

For example, most of the operations carried out in the blocks of device 15 in FIG. 2 could be carried out by software programming.

We claim:

1. Device for determining the number of revolutions of the shaft of a permanent magnet electric motor in a period of time during which it is set in motion by the effect of the connection to a respective source of electrical supply, characterised in that it comprises means for receiving inputs of the supply voltage supplied to and the current flowing in said motor from which counter-electromotive force is developed by said motor in said period of time, means for generating a signal proportional to said developed counter-electromotive force, and means for integrating said generated signal to determine the number of revolutions during said time period.

2. Device according to claim 1, further comprising enabling means for enabling said means for integrating only during said time period.

3. Device according to claim 2, wherein said enabling means consist essentially of a switch.

4. Device according to claim 3, wherein said switch is associated with said means for integrating said generated signal.

5. Device according to claim 1, further comprising third means for integrating the value of said supply voltage, fourth means for generating a voltage dro signal proportional to the voltage drop existing in the armature of said motor by the passage of an electric current due to said supply voltage, said fourth means for generating comprising fifth means for integrating said voltage drop signal, and algebraic summation means having two inputs connected to the outputs of said third and fourth means respectively, thereby obtaining an electrical signal corresponding to the number of revolutions of said motor.

6. Device according to claim 5, wherein said fourth means for generating a voltage drop signal comprises means for recording the value of said current flowing in the armature of said motor.

7. Device according to claim 6, wherein said means for recording comprises essentially a precision resistance connected in series to said motor, and having a resistance value substantially lower than the resistance value of said armature, conversion means for recording the voltage drop which is established at the terminals of said precision resistance, and multiplying means for multiplying an output signal of said recording means by the inverse of the resistance value of said precision resistance.

8. The device of claim 1, wherein said means for integrating provides separately integrated values of said supply voltage and said current.

* * * * *